US009430115B1

(12) United States Patent
Yun

(10) Patent No.: US 9,430,115 B1
(45) Date of Patent: Aug. 30, 2016

(54) STORYLINE PRESENTATION OF CONTENT

(71) Applicant: Amazon Technologies, Inc., Reno, NV (US)

(72) Inventor: Tiffany Yun, Fremont, CA (US)

(73) Assignee: Amazon Technologies, Inc., Reno, NV (US)

( * ) Notice: Subject to any disclaimer, the term of this patent is extended or adjusted under 35 U.S.C. 154(b) by 536 days.

(21) Appl. No.: 13/658,447

(22) Filed: Oct. 23, 2012

(51) Int. Cl.
*G06F 3/048* (2013.01)
(52) U.S. Cl.
CPC .................... *G06F 3/048* (2013.01)
(58) Field of Classification Search
CPC .................................................. G06F 3/0481
USPC ......................................................... 715/738
See application file for complete search history.

(56) References Cited

U.S. PATENT DOCUMENTS

| | | | | |
|---|---|---|---|---|
| 5,703,655 A | * | 12/1997 | Corey et al. | 348/468 |
| 7,757,172 B2 | * | 7/2010 | Yokoi | 715/721 |
| 8,332,894 B2 | * | 12/2012 | Toebes et al. | 725/58 |
| 8,392,183 B2 | * | 3/2013 | Weber | 704/231 |
| 2003/0177503 A1 | * | 9/2003 | Sull et al. | 725/112 |
| 2008/0080743 A1 | * | 4/2008 | Schneiderman et al. | 382/118 |
| 2009/0222432 A1 | * | 9/2009 | Ratnakar | 707/5 |

* cited by examiner

*Primary Examiner* — Matthew Ell
(74) *Attorney, Agent, or Firm* — Sutherland Asbill & Brennan LLP

(57) ABSTRACT

Described herein are systems and methods for generating one or more storylines of content. Tags descriptive of events in the content are generated. Based at least in part on the tags, a storyline is generated from the tags describing the related events throughout the content. Some storylines may comprise multiple tags. A user may select one or more storylines for presentation.

22 Claims, 13 Drawing Sheets

STORYLINE PRESENTATION OF CONTENT

BACKGROUND

Broadcast distribution of content such as video, audio, and so forth has formed a particular style of accessing and presenting content to users. A user would consume content transmitted in a serial fashion, being presented with portions of the content whether desired or not. As a result, the user may be faced with wasting time watching or listening to content which is not of interest to them.

Pre-recorded content such as videotapes, digital versatile disks ("DVDs"), audio cassette tapes, and so forth provide users the capability to fast forward or skip ahead to another scene. However, these capabilities are cumbersome and may result in an undesirable user experience.

Figure 1:
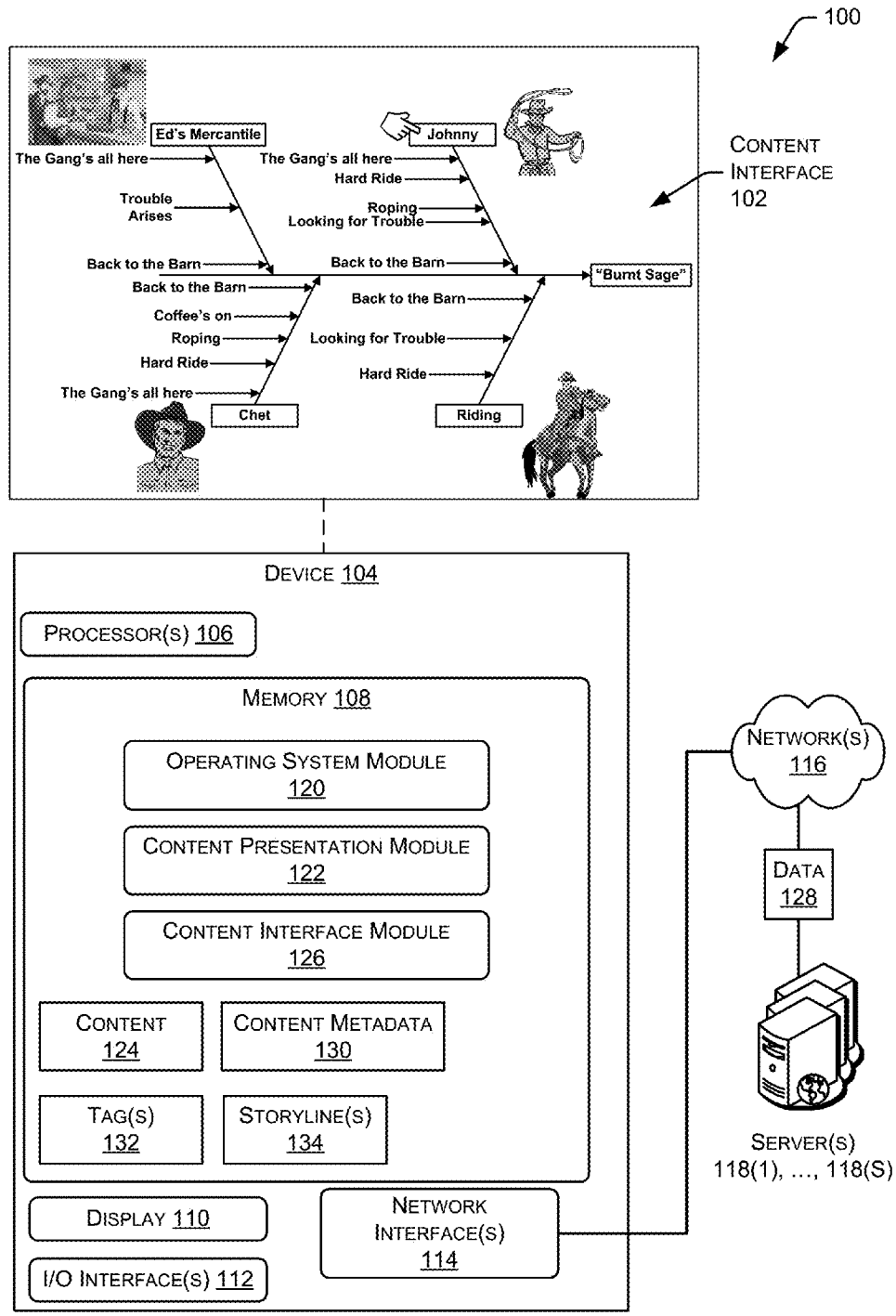
FIG. 1 illustrates a system for generating storylines associated with content and presenting those storylines.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

User may access a wide variety of content including video, audio, electronic books ("eBooks") and more. This content may be pre-recorded and streamed to devices such as televisions, smartphones, tablets, in-vehicle entertainment systems, and so forth for consumption. Traditionally users have been able to consume content in a linear fashion defined by the broadcaster or content producer. For example, a movie played on a broadcast television channel is presented, and the user watches from beginning to end.

As described above, users have the capability to fast forward or skip ahead in some pre-recorded content, such as videotapes, digital versatile disks ("DVDs"), audio cassette tapes, and so forth. However, these capabilities are cumbersome and may result in an undesirable user experience. For example, a user wishing to skip ahead through video content on a DVD either resorts to fast forwarding through the content or using a skip to the next scene, which may go farther than the user wishes. Furthermore, this interaction still calls for manual intervention.

Described in this application are systems and methods for generating storylines associated with content. Within the content certain events may take place, such as a particular character being on-screen, a particular topic or subject being discussed, particular voice, and so forth. For example, in a video an event may be the lead character being in an image frame. In another example, in an audiobook an event may be dialogue associated with a particular character or voiced by a particular character.

A tag may be associated with these events. The tag stores information descriptive of the event. For example, the tag may contain information identifying a character appearing in the video and a start and stop time for that appearance. One or more of the tags may be embedded within the content or stored in a file associated with the content.

A storyline may be generated from these tags. The storyline is an association of tags, and their underlying events, across time in the content. For example, several tags may indicate the presence of a particular character in various portions of a television episode. A storyline associated with that character may be generated from those tags.

The storyline may be used to present the content on a device to the user. For example, the user may wish to view only portions of the content which include the particular character of interest. Instead of inconveniently manually fast forwarding through the content, the user may select the storyline for that character. During presentation of the storyline, the portions of the content which are designated in the storyline are presented. Portions of the content which are not designated in the storyline are omitted from presentation.

The storylines may be based on a character, actor, location, object, activity, theme, and so forth. For example, a baseball game may include storylines for particular athletes, color commentary, background of the athletes, when the ball is in play, and so forth. A single storyline may be presented, or two or more storylines may be presented concurrently. Continuing the example, the user may select a storyline presenting the performance of a particular athlete or a storyline which presents the performances of all athletes but omits opening and closing ceremonies, color commentary, and other portions of the content.

Storylines may change over time. For example, a storyline may extend across a series of pieces of content including television episodes, movies, and so forth. As new content is added to the series, the associated storylines may be updated to reflect this new content.

Presenting content using the storylines may improve the user experience by allowing the user to consume content which is most meaningful to them. Furthermore, by providing different storylines for the same content, new avenues for production, distribution, licensing, and presentation are opened. For example, users may purchase rights to have different storylines for the same content presented.

Illustrative System

FIG. 1 illustrates a system 100 for generating storylines associated with content. and presenting those storylines of content. As described above, content includes, but is not limited to, video, audio, and electronic books ("eBooks").

For ease of illustration, and not by way of limitation, the figures in this disclosure show content with visual elements, such as a movie or television show. However, in other implementations the content may be audible such as audio books, operas, musical anthologies, and so forth.

A content interface 102 is depicted, as presented by a device 104. The content interface 102 may present several storylines associated with a particular piece of content. In this example, the particular piece of content is a Western film entitled "Burnt Sage." Storylines are depicted for a location such as "Ed's Mercantile," characters such as "Johnny" and "Chet", and activities such as "Riding." A user may select one or more of these storylines to watch.

The device 104 may be a television, set-top box, smartphone, table, portable computer, desktop computer, in-vehicle entertainment system, and so forth. The device 104 may comprise one or more processors 106, one or more memories 108, one or more displays 110, one or more input/output ("I/O") interfaces 112, and one or more network interfaces 114. The device 104 may include other devices not depicted here, such as speakers.

The processor 106 may comprise one or more cores and is configured to access and execute at least in part instructions stored in the one or more memories 108. The one or more memories 108 comprise one or more computer-readable storage media ("CRSM"). The one or more memories 108 may include, but are not limited to, random access memory ("RAM"), flash RAM, magnetic media, optical media, and so forth. The one or more memories 108 may be volatile in that information is retained while providing power or non-volatile in that information is retained without providing power.

The display 110 is configured to present visual information to the user. The display 110 may comprise a reflective or emissive display configured to present images to the user. An emissive display emits light to form an image. Emissive displays include, but are not limited to, backlit liquid crystal displays, plasma displays, cathode ray tubes, light-emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 110 may be configured to present images in monochrome, color, or both. In some implementations, the display 110 of the device 104 may use emissive, reflective, or combination displays with emissive and reflective elements.

The one or more I/O interfaces 112 may also be provided in the device 104. These I/O interfaces 112 allow for coupling devices such as keyboards, joysticks, touch sensors, cameras, microphones, speakers, haptic output devices, external memories, and so forth to the device 104.

The one or more network interfaces 114 provide for the transfer of data between the device 104 and another device directly such as in a peer-to-peer fashion, via the network 116, or both. The network interfaces 114 may include, but are not limited to, personal area networks ("PANs"), wired local area networks ("LANs"), wireless local area networks ("WLANs"), wireless wide area networks ("WWANs"), and so forth. The network interfaces 114 may utilize acoustic, radio frequency, optical, or other signals to exchange data between the device 104 and other devices such as one or more server 118(1), 118(2), . . . , 118(S), another device 104, and the so forth. As used herein, letters in parenthesis such as "(S)" indicate an integer value greater than zero.

The one or more memories 108 may store instructions or modules for execution by the processor(s) 106 to perform certain actions or functions. The following modules are included by way of illustration, and not as a limitation. Furthermore, while the modules are depicted as stored in the memory 108, in some implementations, these modules may be stored at least in part in external memory, such as in the server 118 which is accessible to the device 104 via the network 116. These modules may include an operating system module 120 configured to manage hardware resources such as the I/O interfaces 112 and provide various services to applications or modules executing on the processor 106.

A content presentation module 122 is configured to present content 124, such as with the display 110. The content presentation module 122 may access the content 124 from the memory 108 or retrieve at least a portion of the content 124 from the server 118 using the network 116. A content interface module 126 is configured to provide a user interface such as the content interface 102 described above. The content interface module 126 provides one or more user interfaces and is configured to accept and process input from the user.

The device 104 may receive data 128 from the server 118 using the network 116. The data 128 may include one or more of the content 124, content metadata 130, one or more tags 132, or one or more storylines 134. As described above, the content 124 may comprise audio, video, electronic books, and so forth.

The content metadata 130 provides information about the content such as title, genre, cast of characters, and so forth. The content metadata 130 is discussed in more detail below with regard to FIG. 2.

The tags 132 provide machine-readable information about events taking place at a particular point in the content 124. For example, the tag 132 may comprise markup language data indicating a particular character has appeared in the scene and start and stop times for that appearance. The tags 132 are described in more detail below with regard to FIG. 2.

The storylines 134 are based at least in part on associating tags 132 with similar or the same information across time in one or more pieces of the content 124. For example, tags 132 which reference the same character may be combined to provide a character storyline 134. The storylines 134 may also include several different tags 132.

The storyline 134 may manifest across more than one piece of content 124. Over time, a collection of one or more tags 132 which define a particular storyline 134 may change. For example, a storyline about a particular character may be modified over time when the character marries. Or a storyline 134 following a plot may be combined with other storylines 134 at later times or be bifurcated as new subplots are formed. As a result, the set of one or more tags 132 which define a storyline 134 in the first few episodes of a series of content 124 may differ from that storyline 134 at the conclusion of the series. Generation, composition, and use of the tags 132 and the storylines 134 are discussed below in more detail.

Figure 2:
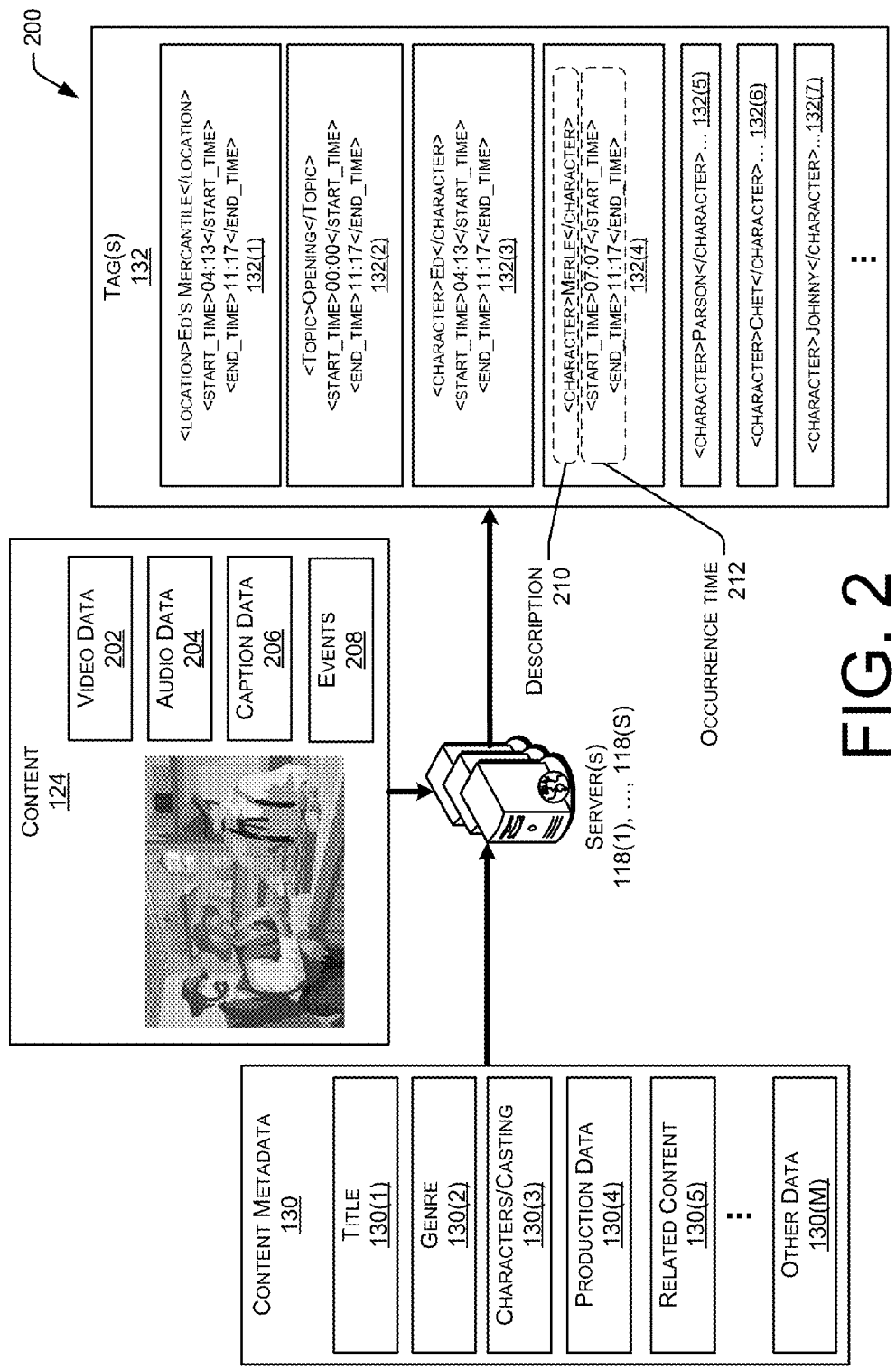
FIG. 2 illustrates some elements which may be used to generate the tags.

FIG. 2 illustrates some elements 200 which may be used to generate the tags 132. The content 124 may comprise one or more of video data 202, audio data 204, caption data 206, or other data such as text of an eBook. The video data 202 may comprise a plurality of image frames, such as a file or portion thereof conforming to the MPEG-4 standard promulgated by the Motion Picture Experts Group ("MPEG"). The audio data 204 may comprise a file or portion thereof conforming to the MPEG-2 Audio Layer III ("MP3") standard. Caption data 206 may include data encoded as closed captions, open captions, subtitles, and so forth. The caption data 206 may include text corresponding to dialogue present in the video data 202, include descriptive language as to the events in the scene, and so forth.

Intrinsic within the content 124 are one or more events 208. The events 208 may include, but are not limited to the appearance of a character, a scene recorded in a particular location, presentation of an object, a particular activity, dialogue or discussion on a particular topic, a particular sound, and so forth. In one implementation, the events 208 are some thing or action perceptible to the user during presentation of the content 124.

The events 208 may correspond to an entire scene, may occur within a scene, or may occur across several scenes. For example, the event 208 of an appearance of a particular character may extend across three contiguous scenes, while the event 208 of appearance of a particular object may only appear for a few moments within a scene. Each event 208 has at least one corresponding occurrence time which specifies the point or interval in the content at which the event takes place.

The content metadata 130 may include a title 130(1), a genre 130(2), data about characters/casting 130(3), production data 130(4), related content 130(5), and other data 130(M). The title 130(1) provides data about the title of the content 124. For example, the title of the content 124 in the illustrations is "Burnt Sage." The genre 130(2) indicates one or more categories to which the content 124 has been designated. Continuing the example, the genre 130(2) of the content 124 may be "Western Adventure."

The character/casting 130(3) data may indicate the cast of characters and actors associated with those characters. For example, the content 124 may have the characters of Ed, Chet, and Johnny, which are played by Clint Woods, John Morrison, and Harry Coburn, respectively. Production data 130(4) may include data such as year filmed, filming locations, and so forth. The related content 130(5) may indicate other pieces of content 124(2), . . . 124(N) which are affiliated with the content 124, such as sequels, spin-offs, and so forth.

The server 118, or in some implementations the device 104, may generate one or more of the tags 132 based at least in part on the content 124. The content metadata 130 may also be used as well to generate the tags 132.

As described above, the tags 132 provide machine-readable information about events 208 taking place at a particular point in the content 124. In some implementations, this encoding may use a markup language, such as extensible markup language ("XML"). In this illustration, the tags 132 include a description 210 and an occurrence time 212. The description 210 provides information about the event which is associated with the tag 132. For example, the tag 132(1) encodes information describing that the scene takes place in "Ed's Mercantile". The occurrence time 212 may specify a particular point in time in the content, or an interval within the content, such as shown here.

In some implementations the tags 132 may include reference information, associating the tag with a particular portion of the content 124 or designating the particular portion of the content at which the event described by the tag occurs. For example, as shown here the occurrence time 212 specifies a start time and an end time for when the location of "Ed's Mercantile" is presented. While times are shown, other referents may be used such as frame number, byte count, and so forth.

The tag 132 may include a reference to one or more occurrence times in the content. For example, a single tag 132 with the description 210 of "Chet" may contain information as to all of the occurrence times at which "Chet" appears in the content 124.

In other implementations, the tags 132 may be placed into a data structure or otherwise associated with particular portions of the content 124. For example, the tags 132 may be embedded within the video data 202.

A given portion of a scene of the content 124 may have many tags 132 associated with it, or none whatsoever. For example, the end credits of a movie may have tags 132 indicating the topic of "credits" while a busy street scene may have many tags 132 describing the actors, location, objects, and so forth.

Once the tags 132 associated with the content 124 are available, one or more storylines 134 may be generated. Generation of the tags 132 and the storylines 134 is discussed below in more detail with regard to the server in FIG. 6.

Figure 3:
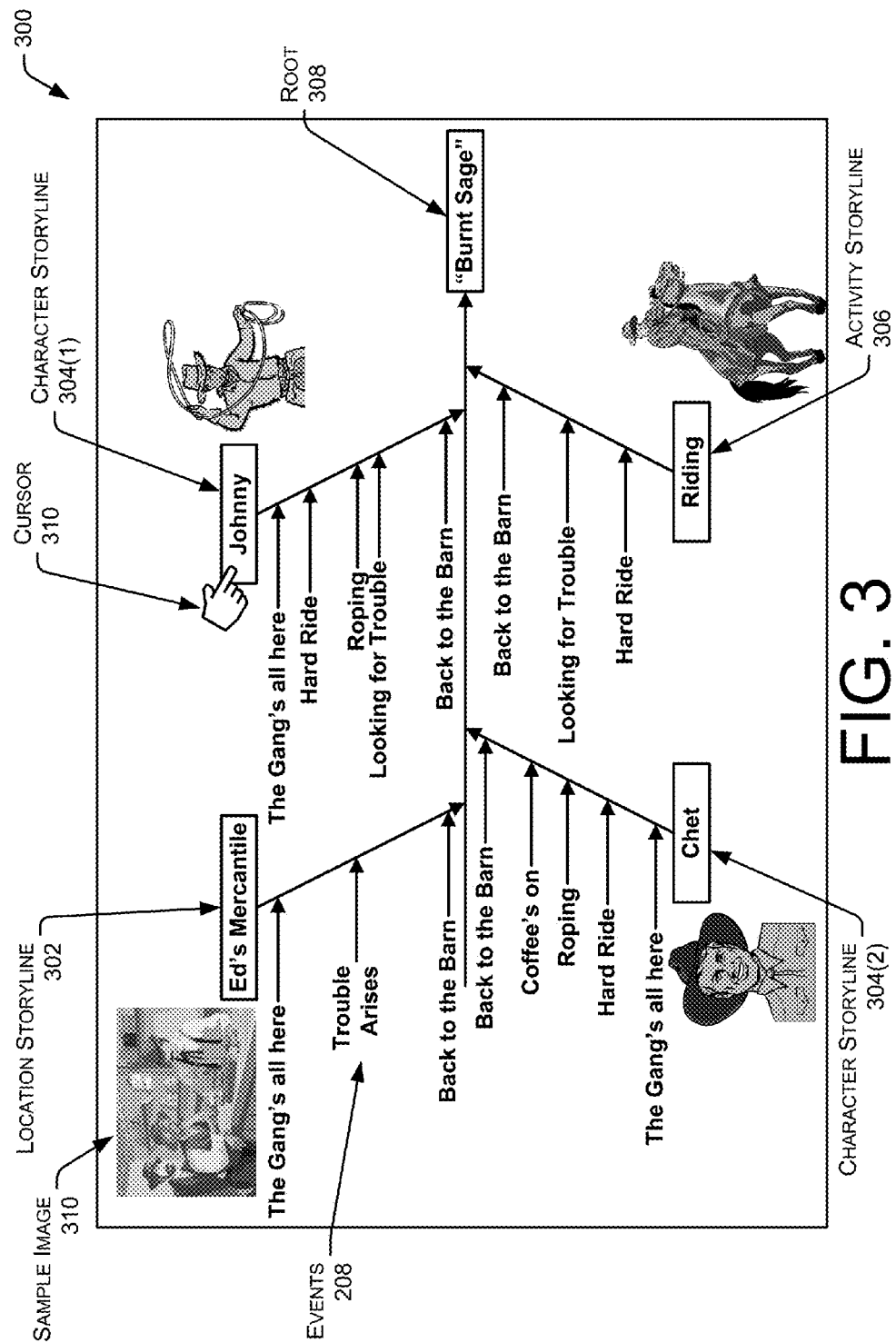
FIG. 3 illustrates a user interface depicting one implementation of storylines associated with the content.

FIG. 3 illustrates a user interface 300 depicting one implementation of storylines 134 associated with the content 124. This user interface 300 may be presented by the content interface module 126.

Four storylines 134 are depicted in this illustration. A location storyline 302, two character storylines 304(1)-(2), and an activity storyline 306. As illustrated, the storylines 134 are made up of a series of events 208. In this representation, the storylines 134 are associated with a root 308 which indicates the title 130(1) of the content 124. In some implementations the storylines 134 may extend across multiple pieces of content. For example, the root 308 and the storylines 134 may extend across the movie "Burnt Sage" as well as the 127 episodes of the television series "Burnt Sage Revisited," and a sequel movie "Burnt Sage, the Sodbusters." Furthermore, the storylines 134 may include different types of content. For example, the storylines 134 may include different forms of content, such as video, audio-only content such as audiobooks, text such as from eBooks, and so forth which are in the "Burnt Sage" series.

The storylines 134 in this representation may have a sample image 310. The sample image 310 may be acquired from a portion of the content present in the respective storyline. For example, for the location storyline 302 the sample image 310 is of a scene in which the location "Ed's Mercantile" is shown.

The location storyline 302 comprises events 208 as described by tags 132 which relate to a particular location. This may be a particular location within the content 124 or a particular location used in generating the content 124. For example, the location storyline 302 may be the name of the location in the content, such as "Ed's Mercantile," or may an actual location used during filming, such as "Backlot Stage 4" in Burbank, Calif.

The character storylines 304(1) and 304(2) comprise events 208 as described by tags 132 which relate to one or more characters. For example, the storyline 304(1) is based on the tags 132 which reference the character "Johnny" while the storyline 304(2) is based on those tags 132 which reference the character "Chet." As mentioned above, the storylines 134 may extend across multiple pieces of content. For example, the storyline 304(1) for the character "Johnny" may include occurrences and information from that character's other appearances in "Burnt Sage Revisited" and "Burnt Sage, the Sodbuster."

The activity storyline 306 comprises events 208 as described by tags which relate to one or more actions or activities. For example, as shown here the activity of "Riding" will associate into a single storyline those events 208 which have tags associated with cowboys as well as tags associated with horses.

A cursor 310 or other indicator may be used to provide the user with feedback as to which of the one or more storylines 134 are selected for presentation. As described above, the user may select for presentation a single storyline 134 or several storylines 134. In one implementation, the presentation may be serial in that a first storyline 134(1) is presented, then 134(2), and so forth. In another implementation, the user may select to present the multiple storylines 134 concurrently. For example, the user may select to present the character storyline 304(1) about "Johnny" along with the activity storyline 306 of "riding" so that, while watching the movie, the user will see content 124 which includes Johnny or horseback riding.

Figure 4:
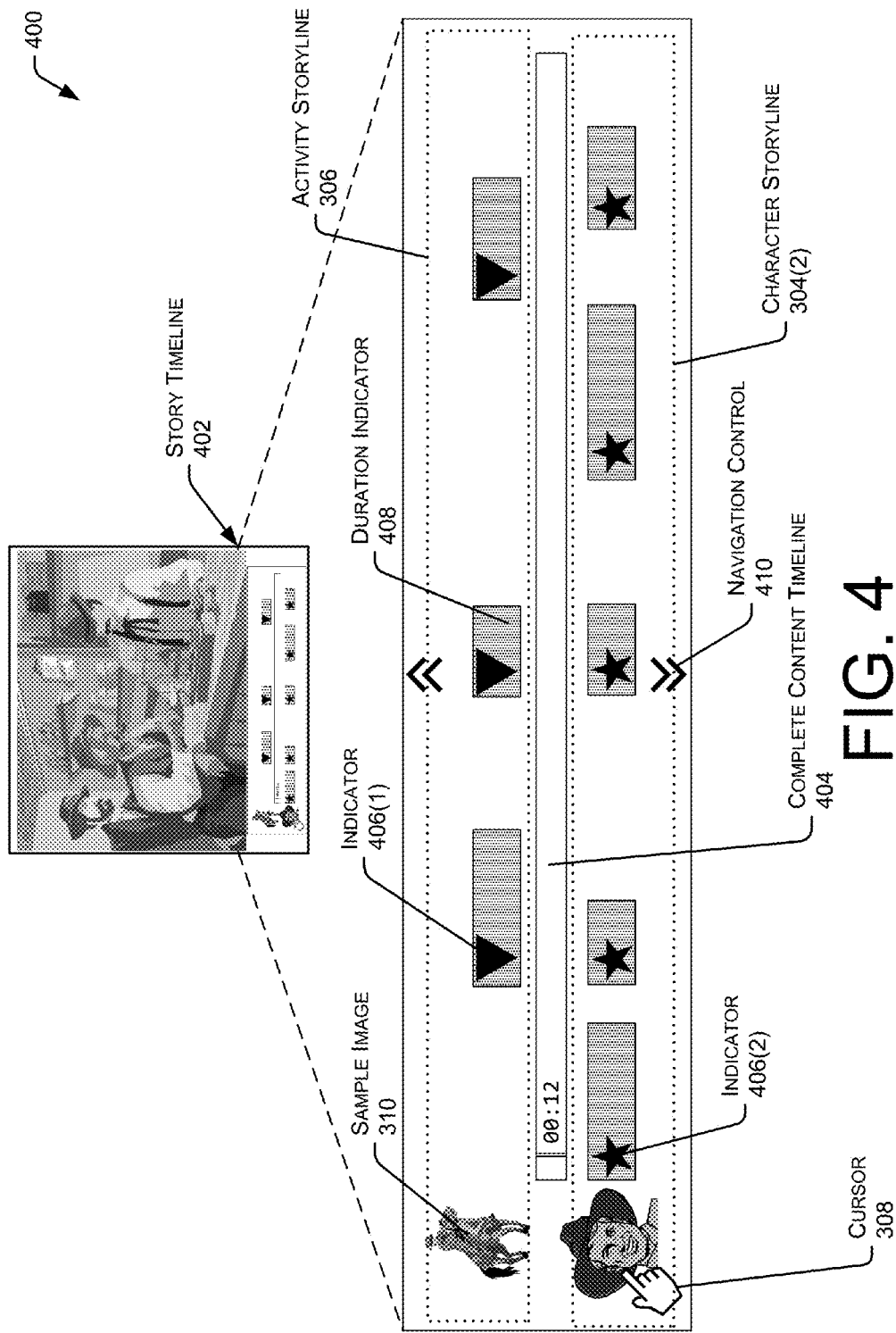
FIG. 4 illustrates a user interface depicting another implementation of storylines associated with the content.

FIG. 4 illustrates a user interface 400 depicting another implementation of presenting storylines 134 associated with the content 124. In this illustration a story timeline 402 is depicted on the display 110.

In this implementation, an element representative of the complete content timeline 404 is depicted, along with a current location being presented. This element provides a linear timeline of the content. Positions relative to the complete content timeline 404 may be proportionate to the time within the content 124. For example, a position at the extreme left of the complete content timeline 404 is associated with the beginning of the content 124 while the extreme right is associated with the end. In this example, the location currently being presented on the display 110 is at time 00:12.

Here, the character storyline 304(2) and the activity storyline 306 are presented. Indicators 406 are used to represent locations within the content 124 at which the events 208 specified in the tags 132 are present. For example, indicator 406(1), illustrated as upside down triangles, corresponds to portions of the content 124 in which horseback riding has been tagged. Similarly, indicator 406(2), illustrated as a star, corresponds to portions of the content 124 in which the character "Chet" appears.

A duration indicator 408 of the events 208 as tagged may be provided. As described above the tags 132 may include information such as start and end times within the content 124. From this information, or similar information, the duration of the event 208 may be determined and the duration indicator 408 may be presented.

Navigation controls 410 or other controls may be presented in the user interface 400. These controls may allow the user to scroll or otherwise move among the different storylines available. In some implementations, the user interface 400 may also present controls allowing the user to build a storyline for tags 132 associated with the content 124.

Similar to that described above with regard to FIG. 3, in some implementations a cursor 310, sample image 310, and so forth may be presented in the user interface 400.

Figure 5:
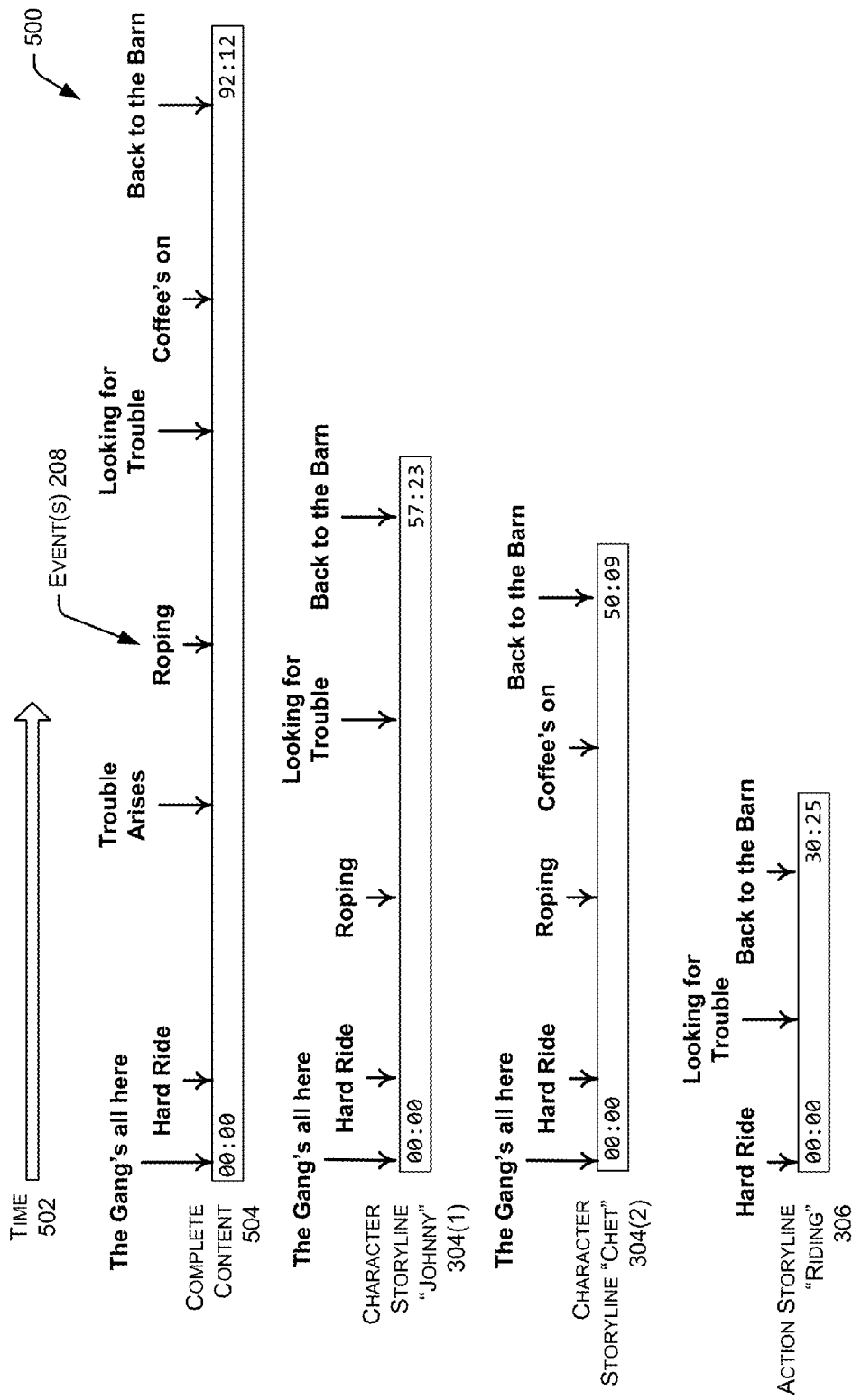
FIG. 5 illustrates content and various storylines with their differing composition.

FIG. 5 illustrates content 124 and various storylines 134 with their differing compositions. The user may select one or more storylines 134 for presentation. During presentation of the selected storylines 134, portions of the content 124 which are designated by the tags 132 in the storylines 134 are presented. In comparison, portions not designated by the tags are not presented.

In this illustration time increases from left to right, as indicated by arrow 502. Depending upon the portions of the content 124 indicated by the tags 132 in the storylines 134, the total duration of the content as presented to the user may vary.

In this illustration, the various events 208 are depicted at their relative positions within the content 124. A representation of complete content 504 is depicted. Should the user select to present the content 124 without applying any of the storylines 134, the entire movie "Burnt Sage" would run a total of 92:12 (minutes:seconds).

In comparison, the character storyline 304(1) for "Johnny" comprises a subset of the events 208, in particular those events 208 which have tags 132 implicating "Johnny." For example, these may be tags 132 indicating that "Johnny" is in the picture, or is a subject of dialogue by other characters. The character storyline 304(1), when presented from beginning to end is shorter than the complete content 504, finishing in 57:23.

The character storyline 304(2) for "Chet" comprises different events 208 than those associated with "Johnny". As a result, this storyline 304(2) includes events 208 such as "Coffee's on" while omitting "Looking for trouble".

Finally, as depicted here, the action storyline 306 is briefest of all, with only three events 208 involving horseback riding in this piece of content 124. As a result, the total running time for this storyline 306 is 30:25. Portions of the content 124 which do not have tags 132 indicating horseback riding, such as "the Gang's all here" or "coffee's on" do not appear in this storyline 306, and thus would not be presented to the user.

By selecting one or more storylines 134 of particular interest, the user may be able to consume content they might not otherwise have time for. For example, the user may be a fan of the character "Chet" but only has about an hour to watch the movie. By selecting the character storyline 304(2), the user is able to consume the portions of the content of particular interest and within the available time. Should the user wish to later view another storyline 134, or view the complete content 504, those options may also be available.

Figure 6:
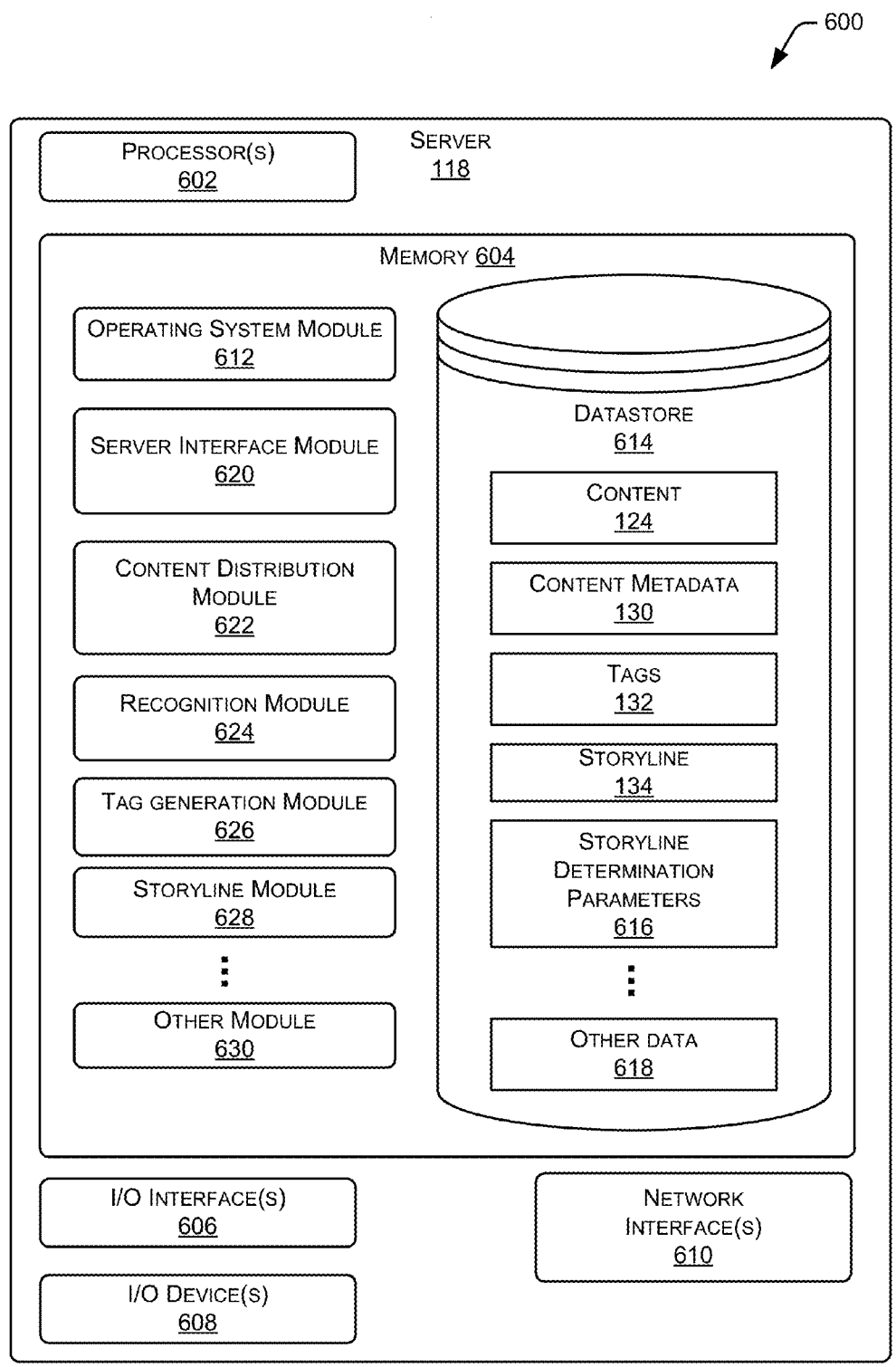
FIG. 6 illustrates a block diagram of a server configured to generate tags descriptive of the content and from those tags generate storylines.

FIG. 6 illustrates a block diagram 600 of the server 118 configured to generate tags 132 descriptive of the content 124, and from those tags 132 generate storylines 134. The server 118 may comprise one or more processors 602, one or more memories 604, one or more input/output ("I/O") interfaces 606, one or more I/O devices 608, and one or more network interfaces 610. The server 118 may include other devices not depicted.

The processor 602 may comprise one or more cores and is configured to access and execute at least in part instructions stored in the one or more memories 604. The one or more memories 604 comprise CRSM. The one or more memories 604 may include, but are not limited to, random access memory ("RAM"), flash RAM, magnetic media, optical media, and so forth. The one or more memories 604 may be volatile in that information is retained while providing power or non-volatile in that information is retained without providing power.

The one or more I/O interfaces 606 may also be provided in the server 118. These I/O interfaces 606 allow for coupling the I/O devices 608 such as keyboards, displays, touch sensors, external memories, cryptographic processors, and so forth to the server 118.

The one or more network interfaces 610 provide for the transfer of data between the server 118 and another device directly such as in a peer-to-peer fashion, via the network 116, or both. The network interfaces 610 may include, but are not limited to, PANs, LANs, WLANs, WWANs, and so forth. The network interfaces 610 may utilize acoustic, radio frequency, optical, or other signals to exchange data between the server 118 and another device such as router, network switch, another server 118, and so forth.

The one or more memories 604 may store instructions or modules for execution by the processor 602 to perform certain actions or functions. The following modules are included by way of illustration, and not as a limitation. Furthermore, while the modules are depicted as stored in the memory 604, in some implementations, these modules may be stored at least in part in external memory, such as in other devices which are accessible to the server 118 via the network 116. These modules may include an operating system module 612 configured to manage hardware resources such as the I/O interfaces 606 and provide various services to applications or modules executing on the processor 602.

The one or more memories 604 may also store a datastore 614. The datastore 614 may comprise one or more databases, files, linked lists, or other data structures. The datastore 614 may be configured to store content 124, content metadata 130, tags 132, storylines 134, storyline determination parameters 616, or other data 618. The storyline determination parameters 616 are used to determine the association between tags 132 and their inclusion into the storyline 134. The storyline determination parameters 616 are discussed in more detail below with regard to FIG. 7.

A server interface module 620 may be stored in the memory 604 and configured to provide a user interface, application interface, or both, which handles inputs and outputs from the user, the device 104, and so forth during operation of the server 118. For example, the server interface module 620 may be configured to provide an application programming interface which the content presentation modules 122 may use to access the server 118 and initiate presentation of one or more of the storylines 134.

A content distribution module 622 may be stored in the memory 604. The content distribution module 622 is configured to manage and provide content 124 to the device 104. The content distribution module 622 may apply one or more storylines 134 to the content 124 for presentation. The content 124 may be provided to the device 104 for presentation using a transfer of a complete file representative of the presented content, or by streaming portions of the content 124 to the device.

A recognition module 624 stored in the memory 604 is configured to recognize events 208 or event constituents within the content 124. The recognition of events 208 or event constituents may be manual, automatic, or a combination thereof. The recognition module 624 generates data about components of the events 208. The recognition module 624 may provide facial recognition, voice recognition to identify a particular speaker, speech recognition to transform spoken words to text for processing, object recognition, optical character recognition, and so forth. For example, the recognition module 624 may be configured to identify the frames in which a particular character is visible. In another example, the recognition module 624 may be configured to detect the presence of a particular trademark on objects within the images.

The recognition module 624 may also access data such as the content metadata 130 to generate data about the components of the events 208. For example, the recognition module 624 may identify speech from a particular actor, and using the content metadata 130 associate the dialogue of that particular actor with the actor's character in the content 124.

The memory 604 may also store a tag generation module 626 configured to use data provided by the recognition module 624, the content metadata 130, and so forth to generate one or more of the tags 132. For example, the tag generation module 626 may use data from the recognition module 624 to associate a portion of the content 124 with the character of "Johnny" and generate the corresponding tag 132(7). The generation of the tags 132 may be manual, automatic, or a combination thereof.

The tag generation module 626 may be configured to look for data embedded within the content 124. An image frame with a barcode or other data may be inserted into the content 124 which contains information which may be used to generate the tag 132. For example, a single frame containing a barcode with information such as the name of a character appearing in the subsequent frames may be provided by a production company or content distributor. During presentation, the single frame may be imperceptible to the user. In some implementations, the content distribution module 622 may be configured to remove these embedded frames prior to presentation by the device 104.

A storyline module 628 is stored in the memory 604. The storyline module 628 is configured to generate one or more storylines 134 based on one or more of the tags 132 which are descriptive of the events 208 in the content 124. The storyline module 628 may be configured to adjust boundaries of the portion of the content 124 specified by the tags 132. For example, the tag 132(7) may specify time a start time of 7:07 and an end time of 11:17. However, the storyline module 628 may adjust the storyline 134 such that during presentation the content is provided from 7:00 to 12:00.

In another implementation, the storyline module 628 may be configured to adjust the boundaries of the portion of the content 124 to correspond to scene changes, changes in camera views, visual effects, blanking signals, and so forth. For example, the storyline module 628 may be configured to change the start time of the tag 132(7) to 6:56 at which time there is a change in camera angle and the end time of the tag to 13:15 to correspond with a transition between scenes.

The storyline module 628 may also be configured to provide or designate for presentation transition effects. For example, a fade to black may be used to exit one portion of content 124 designated by the tag 132(7) while a fade in from black to the image may be used to present the next portion of content 124 in the storyline 134. In other implementations other transitions effects may be used. For example, audio may be ramped down or ramped up in an audiobook, or a page may be inserted into an eBook. The adjustment of boundaries, insertion of transition effects, and other actions by the storyline module 628 may be provided to improve the overall user experience. For example, the insertion of transition effects may be used to prevent jarring transitions from one portion of the content 124 to the next during presentation.

The storyline module 628 may be configured to generate the storylines 134 in advance of distribution, or on demand. The generation of the storylines 134 may be based at least in part on one or more of the storyline determination parameters 616 which are described below with regard to FIG. 7.

Other modules 630 may be present in the memory 604 as well. For example, a digital rights management module may be present and configured to manage access rights to the content 124.

Figure 7:
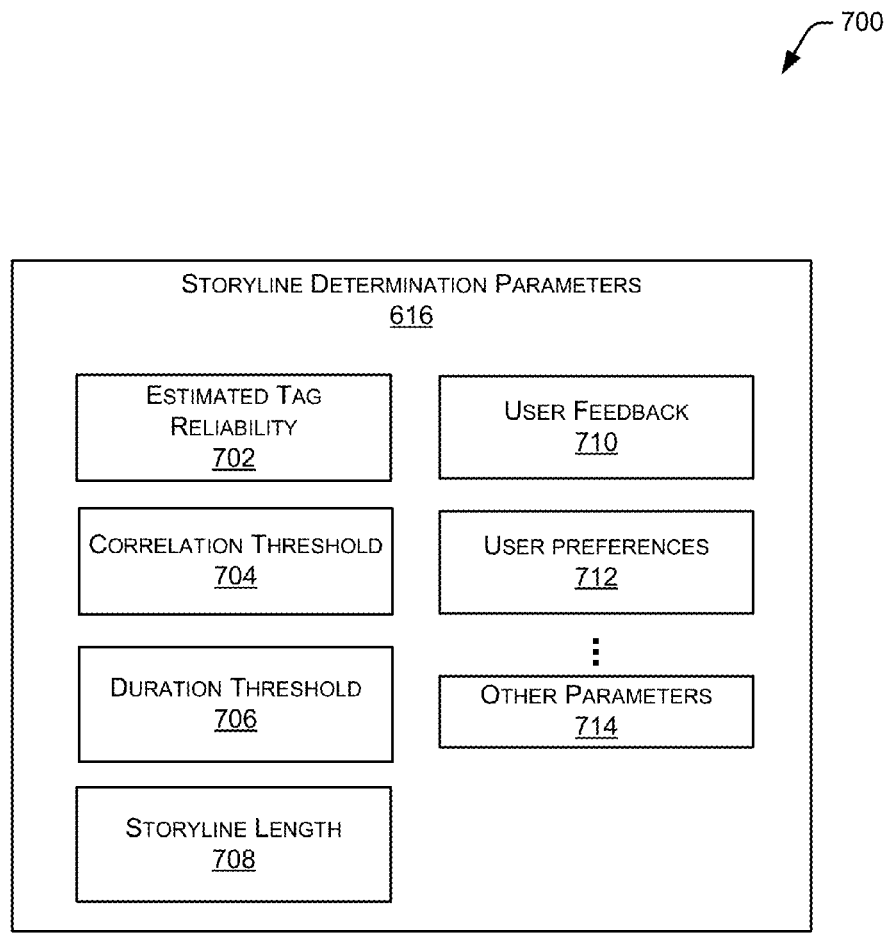
FIG. 7 is a block diagram of storyline determination parameters which may be used to generate a storyline.

FIG. 7 is a block diagram 700 of storyline determination parameters 616 which may be used by the storyline module 628 to generate one or more storylines 134. Depending upon the quality of the tags 132, a particular storyline 134 may be useful or difficult to follow. The storyline module 628 may use one or more storyline determination parameters 616 to generate which tags to include in the particular storyline 134. For example, a tag 132 may be generated by another character talking about "Chet" briefly, but that portion of the content 124 may not be worthwhile to include into the "Chet" character storyline 304(2).

The storyline determination parameters 616 may include estimated tag reliability 702. The estimated tag reliability 702 provides a metric as to how accurately the tag 132 relates to the actual event 208. For example, a manually entered tag 132 may be given a high reliability while a tag 132 generated automatically and based on several variable inputs such as voice and speech recognition may be assigned a lower estimated tag reliability 702. The estimated tag reliability 702 may also be defined as a confidence interval for the data upon which the tag 132 is based. In some implementations, a tag reliability threshold may be specified such that tags are included in a particular storyline when they meet or exceed the threshold.

A correlation threshold 704 may specify a tolerance or correlation factor by which different tags 132 may be associated with one another in the same storyline 134. For example, the tag 132(1) for the location "Ed's Mercantile" may have a correlation with the tag 132(3) for the character "Ed" which is above the threshold. As a result, a storyline 134 may be generated which includes both tags 134(1) and 132(3).

A duration threshold 706 may be specified. The storyline module 628 may be configured to disregard during storyline 134 generation those tags 132 which have a duration below the threshold. For example, a tag 132 for an event 208 comprising a single mention of the character "Chet" may not be included in the character storyline 304(2).

A storyline length 708 may be specified which defines a minimum, maximum, or minimum and maximum length for the storyline. For example, the storyline length 708 may be set to 60 minutes. The storyline module 628 may select the tags 132 from those with the highest estimated tag reliability 702 to the least, building the storyline 134 until the storyline length 708 of 60 minutes is reached.

User feedback 710 may be used to generate the storylines 134. The users may provide feedback as to whether a particular portion of the storyline 134. This feedback may include selection that the content is irrelevant, good, bad, or another rating or indication about the desirability to include of that portion of the content 124. For example, a portion of the content 124 which is ranked by a threshold number of users may be removed from the storyline 134. The user feedback 710 may also include manually generated or modified tags 132.

User preferences 712 may also be specified. For example, a particular user may define particular events 208 which they prefer to generate storylines 134 about. Other parameters 714 may be specified, such as a threshold number of tags 132 required to generate a separate storyline 134.

Different storyline determination parameters 616 may be applied with storylines 134 of differing scope, the scope ranging from globally across all users to an individual user or group of users. For example, a global storyline 134 which is accessible to all users may specify the estimated tag reliability 702 but omit a duration threshold 706. In comparison, a user-specific version of the same storyline 134 may be based on the global storyline 134 but apply a duration threshold 706. The user-specific version of the storyline 134 may be considered a subset of the global storyline 134.

Figure 8:
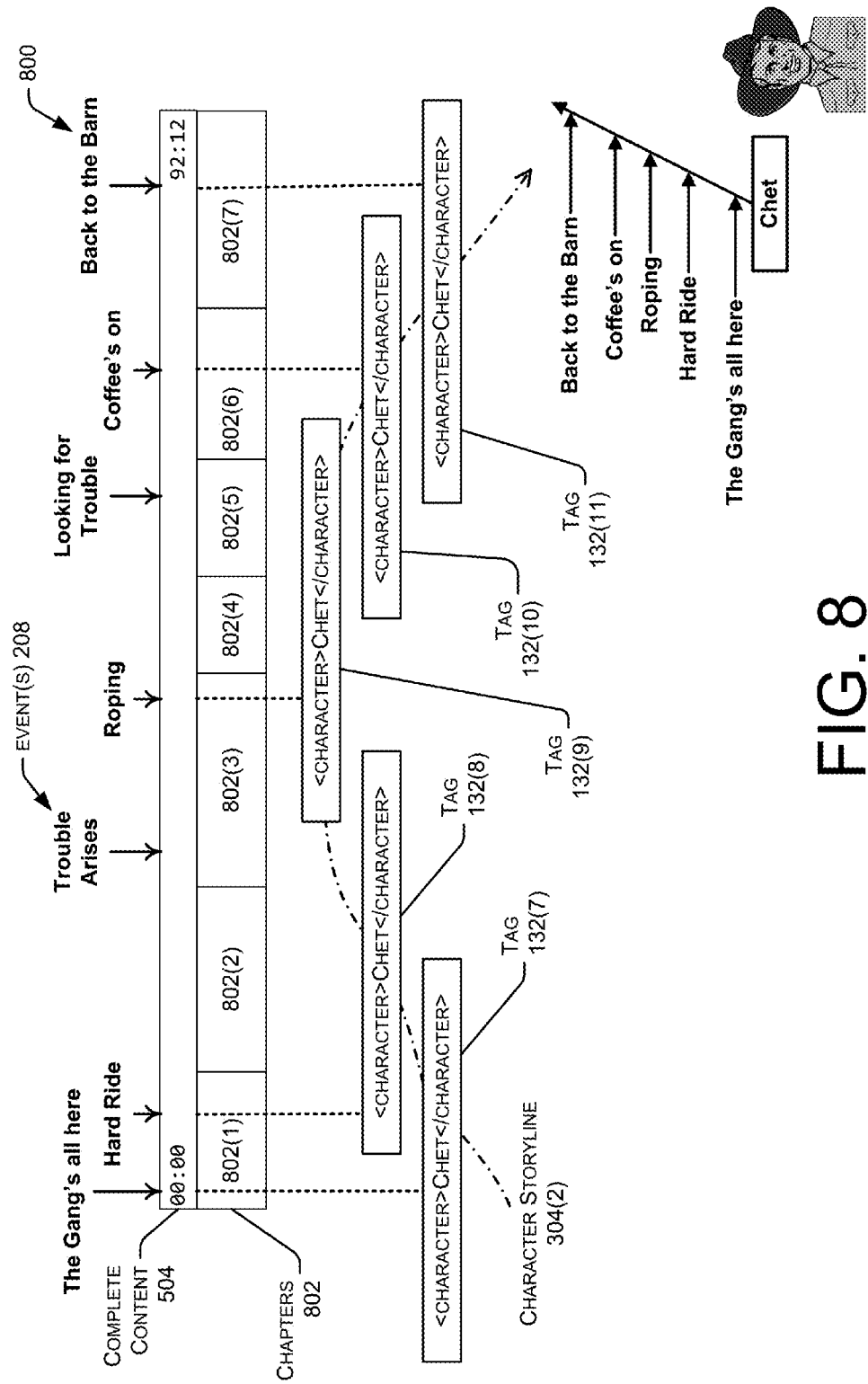
FIG. 8 illustrates a storyline comprising multiple occurrences of a particular tag value throughout the content.

FIG. 8 illustrates 800 a storyline 134 comprising multiple occurrences of a particular tag 132 value throughout the content 124. In this illustration, the character storyline 304(2) is depicted, along with a timeline of the complete content 404 and various events 208 associated with the character of "Chet." Also indicated is the extent of different chapters 802 in the content 124. The content 124, such as a movie distributed on a DVD, may have several different chapters. The chapters 802 may correspond to scenes in the content 124. In this illustration, seven chapters 802(1), 802(2), ..., 802(7) are depicted.

At each of these events 208 a tag 132(7)-(11) has been generated. The storyline module 628 has generated the storyline 304(2) from the tags 132 which share a common description 210, that of "<character>Chet</character>". These tags reference the same character, "Chet," but are associated with different locations or portions of content. These tags may be in the same or different chapters 802 in the content. For example, the tags 132(7) and 132(8) are both in the chapter 802(1), while a single tag 132(9) is found in chapter 802(3). During presentation of the content 132 as defined by the storyline 134, the user may thus see only portions of a particular chapters, in particular those portions which are indicated by the occurrence time 212 tags 132, instead of the entire chapter.

In one implementation, during presentation of the content 132 as defined by the storyline 134, the user may experience a sequential flow of the events 208 indicated by the tags 132 in a particular arrangement. This arrangement may be by increasing time within the content 124. For example, as shown here the user would be presented first with the scene "the gang's all here", followed by "hard ride," "trouble arises," "roping," "looking for trouble," "coffee's on," and "back to the barn."

Illustrative Processes

Figure 9:
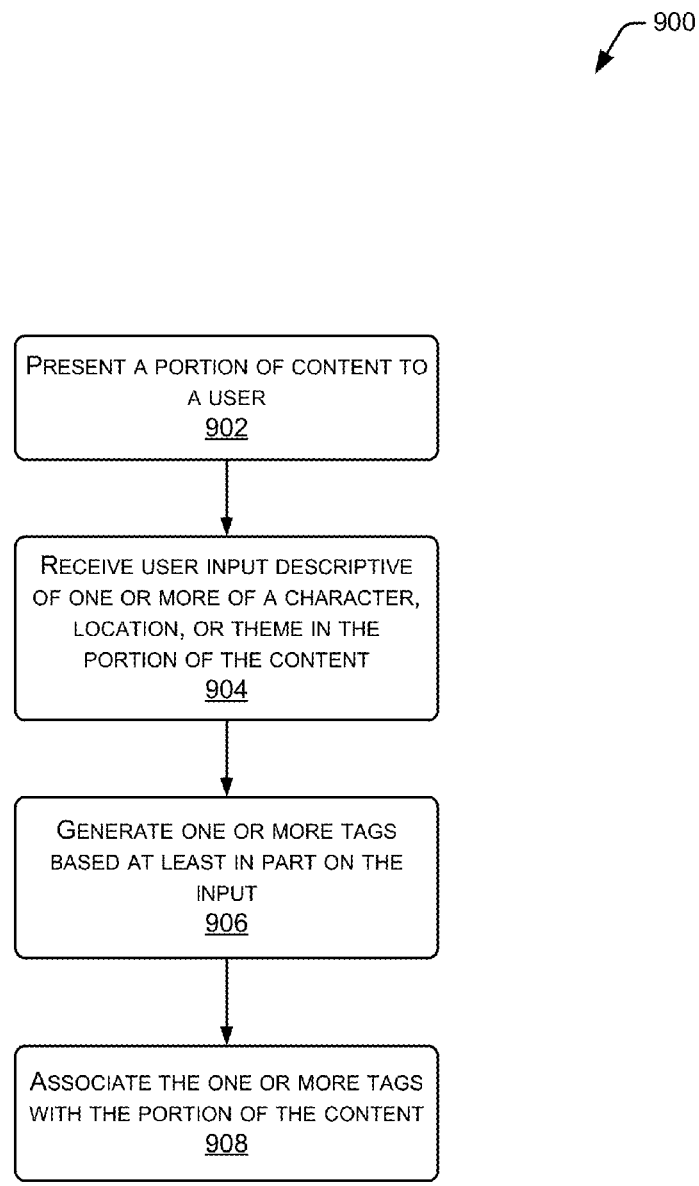
FIG. 9 illustrates a flow diagram of a process for manually generating tags associated with the content.

FIG. 9 illustrates a flow diagram 900 of a process for manually generating tags 132 associated with the content 124. This user interface may be configured to couple with the server interface module 620 to accept the input. For example, during post-production of content one or more production users may use a web-based user interface to manually enter tags 132.

Block 902 presents a portion of the content 124 to the user. Block 904 receives user input descriptive of one or more of a character, location, theme, or other event 208 or event 208 components which are present in the portion of the content 124. For example, the user may enter information indicating that the portion of content from 7:07 to 11:17 includes the character of "Merle."

Block 906 generates one or more tags 132 based at least in part on the input. For example, the tag generation module 626 may generate the tag 132(4) for the event 208 of the appearance of the character "Merle."

Block 908 associates the one or more tags 132 with the portion of the content 908. For example, the tag 132 may include the content location reference 212. In other implementations, the tag 132 may be associated with a particular portion of the content 124.

In one implementation the user input from a plurality of users may be used to validate a given tag 132. For example, several users may need to enter the same or similar tags 132 before the tag 132 is used to generate a storyline 134. In another implementation the user may be presented with an automatically generated tag 132 and be asked to validate the tag 132 is correct.

Figure 10:
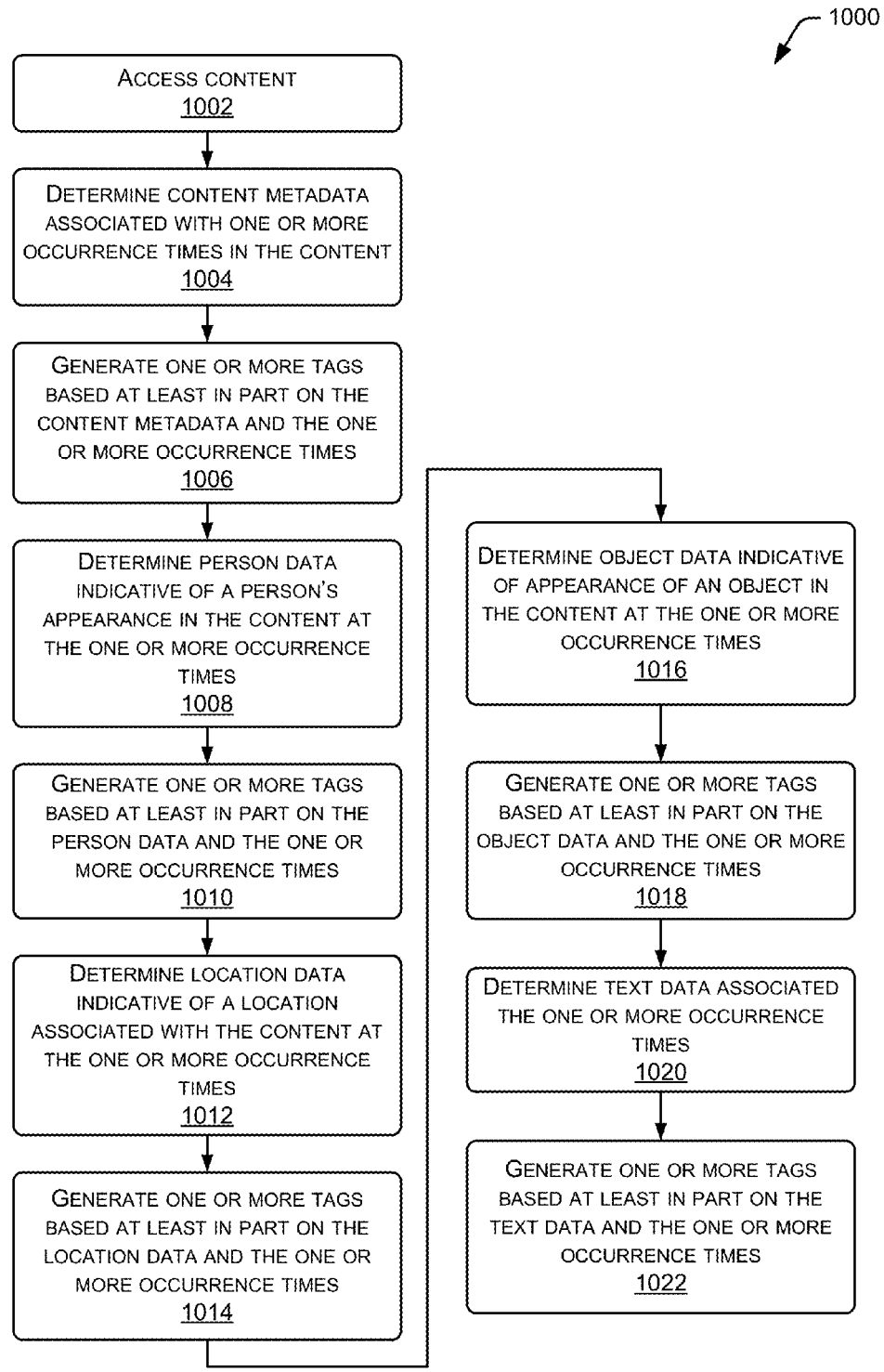
FIG. 10 illustrates a flow diagram of an automated process for generating tags associated with the content.

FIG. 10 illustrates a flow diagram 1000 of an automated process for generating tags associated with the content 124.

This process may be implemented by the device 104, server 118, or both. While the process is described below using a singular reference to the content 124, in other implementations the process may be applied to one or more pieces of content 124. For example, the tags may be generated for content 124 comprising an entire television series.

Block 1002 accesses at least a portion of content 124. For example, the content 124 may be video content such as the movie "Burnt Sage."

Block 1004 determines the content metadata 130 associated with the content 124. The content metadata 130 may be associated with one or more occurrence times 212 in the content 124, the entire piece of content 124, and so forth. For example, the content metadata 130 may comprise the genre 130(2) and the characters/casting data 130(3), a scene or chapter listing indicating intervals within which those scenes or chapters appear, production notes for particular scenes or chapters, and so forth.

Block 1006 generates one or more tags 132 associated with the content 124 based at least in part on information in the content metadata 130 and the one or more occurrence times 212. For example, the content metadata 130 may provide information about production notes such as the type of camera used to generate an image where the content 124 is video content. The one or more tags 132 may refer to the portions of the content recorded with the camera.

In some implementations, the content metadata 130 may be used with other information to generate the tags 132. For example, as described below, with regard to block 1008, using information about the cast found in the content metadata 130, facial recognition may be used to determine that in one scene Clint Woods, John Morrison, and Harry Coburn who play the characters of Ed, Chet, and Johnny, respectively, are present. This may be used to generate tags indicating where the characters appear in the content 124.

Block 1008 determines person data indicative of appearance of a person in the content 124 at the one or more occurrence times 212 in the content 124. The recognition module 624 may be configured to use facial recognition to distinguish and identify different faces. In one implementation, the determination may be distinguishing one person from another without identifying the person. For example, the system may determine that a scene includes two different characters but has not determined their identity. In another implementation, the determination may include identifying the person, such as associating the person with a character name, actor name, and so forth. As described above, information about the cast found in the content metadata 130 may be used to aid in this determination with identification.

Block 1010 generates one or more of tags 132 associated with the content 124 based at least in part on the determined person data and the one or more occurrence times 212. For example, the tag may specify that the character "Merle" has an occurrence time 212 from time 07:07 to 11:17 in the content 124.

Block 1012 determines location data indicative of a location associated with the content 124 at the one or more occurrence times 212 in the content 124. For example, the location data may be determined based at least in part on content metadata 130 such as production notes indicating where the content 124 was recorded. Or the recognition module 624 may use image recognition to determine a location based on images appearing in the content 124, where the content 124 includes imagery. For example, the recognition module 624 may use optical character recognition to read the sign on an exterior image of "Ed's Mercantile" to determine the location as "Ed's Mercantile."

Block 1014 generates one or more of the plurality of tags associated with the content 124 based at least in part on the determined location data and the one or more occurrence times 212. Continuing the example of FIG. 2, the tag 132 may indicate that the location is "Ed's Mercantile" with an occurrence time of 04:13 to 11:17 in the content 124.

Block 1016 determines object data indicative of an object appearing in the content 124 at the one or more occurrence times 212. For example, the recognition module 624 may identify a saddle in the image.

Block 1018 generates one or more tags 132 associated with the content 124 based at least in part on the determined object data and the one or more occurrence times 212. For example, the tag 132 may indicate that a saddle appears at times 51:13 to 55:21.

Block 1020 determines text data associated with the one or more occurrence times 212 in the content 124. The text data may comprise information from retrieving one or more text captions, recognizing speech with a speech recognition module, or recognizing writing with an optical character recognition module. For example, the recognition module 624 may use optical character recognition to read signs or text appearing in video content 124. The text data may also be based at least in part on closed captions, open captions, subtitles, and so forth.

Block 1022 generates one or more tags associated with the one or more pieces of content 124 based at least in part on information in the determined text data and the one or more occurrence times 212. For example, where the text is generated from dialogue with two characters discussing "Chet", a tag 132 associating the event 208 of the dialogue may be generated.

Figure 11:
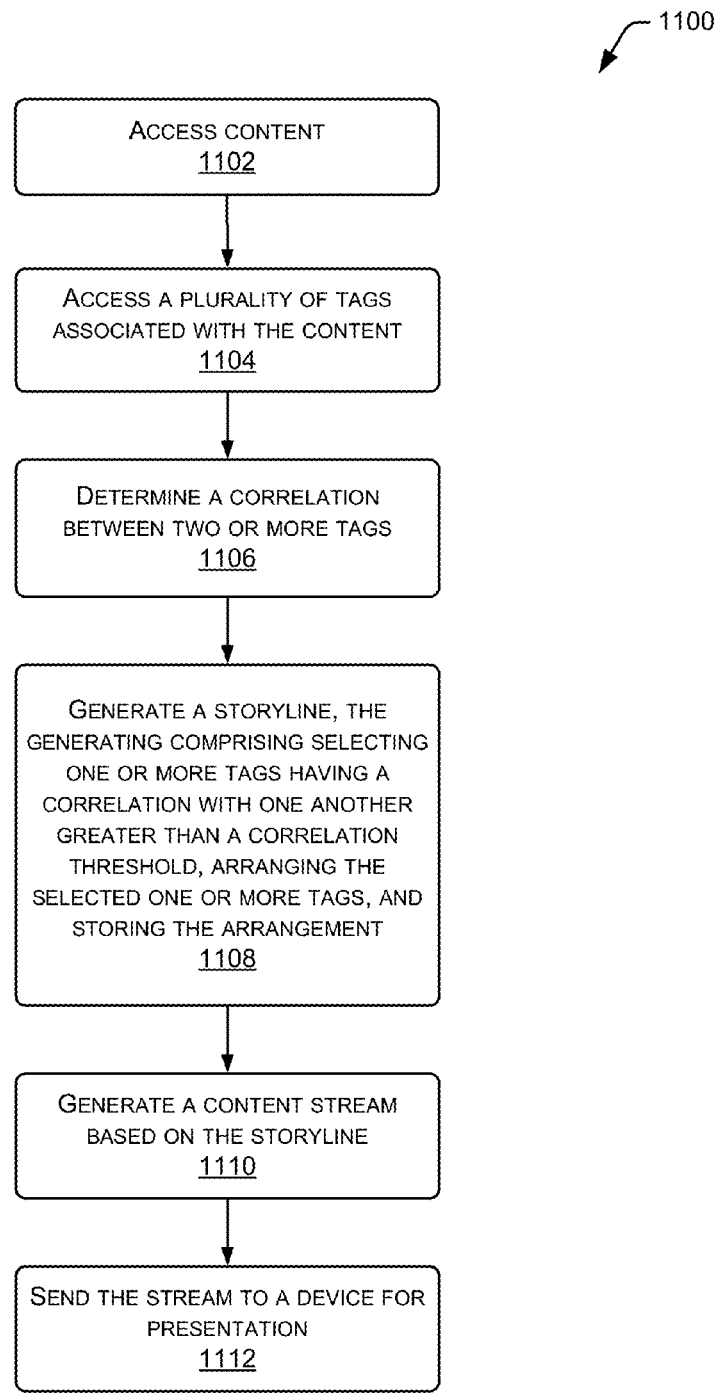
FIG. 11 illustrates a flow diagram of a process for generating one or more storylines.

FIG. 11 illustrates a flow diagram 1100 of a process for generating one or more storylines. This process may be implemented by the device 104, server 118, or both. As described above, while the process is described below using a singular reference to the content 124, in other implementations the process may be applied to one or more pieces of content 124. For example, a storyline 134 may be generated which extends across a television series and subsequent spinoff series.

Block 1102 accesses the content 124, or a portion thereof. In some implementations, block 1102 may be omitted. Block 1104 accesses a plurality of tags 132 associated with the content 124. As described above, the tags 132 may comprise information indicative of events 208 in the accessed content 124 and the occurrence times 212. For example, the tags 132 generated as described above with regard to FIG. 10 may be accessed.

As also described above, the events 208 may include, but are not limited to appearance of a particular character in a portion of the content, appearance of a particular object in a portion of the content, a particular location in a portion of the content, dialog associated with a portion of the content, or, a particular sound in a portion of the content.

The storyline 134 may combine tags 132 which are associated with different events 208. In some implementations, block 1106 may determine a correlation between two or more tags 132. This correlation may indicate that the tag 132(1) for the location "Ed's Mercantile" may have a correlation with the tag 132(3) for the character "Ed". This correlation may be used to determine which groupings of tags 132 form relationships which may be relevant to the user during presentation. For example, tags 132 indicating appearance of "Chet" and "Johnny" may be highly correlated, and a storyline 134 may be generated as described next which includes tags for both characters. The storylines

134 may thus include tags which have different descriptions 210 but are correlated so as to correspond to a particular theme. Continuing this example, the theme may be the relationship between the characters "Chet" and "Johnny."

In another implementation, different tags 132 may be manually combined. For example, the activity storyline 306 of "riding" may be based on a combination of tags indicating cowboys and horses.

Block 1108 generates one or more storylines 134. The generating may comprise selecting one or more tags 132 based on one or more criteria, arranging the selected one or more tags 132, and storing the arrangement of the selected one or more tags 132 as the storyline 134.

The selection of the one or more tags 132 may be based on one or more criteria applied to the description 210 and in some implementations the occurrence time 212. The one or more criteria may include a character name, an actor name, a theme, a plot line, a location, an object, or an activity. For example, tags 132 containing description information 210 indicating a particular character may be selected.

The arranging may comprise sorting the tags 132 by the occurrence time 212 in ascending order from lowest occurrence time 212 to greatest occurrence time 212. This arrangement provides a sequential presentation of the content 124 designated by the storyline 134. In other implementations, other arrangements may be used, such as arranging by increasing time of the chronology of the story. For example, a storyline 134 for a character which features may flashback and flash-forward scenes may result in a storyline which presents the scenes showing the flashbacks first, consistent with their earlier appearance in the internal chronology of the story as being earlier events. The storing may comprise writing the arrangement in the CRSM such as the memory 108 of the device 104 or the memory 604 of the server 118.

In implementations where the correlation between the tags 132 is to be considered, the criteria for the selecting the one or more tags may include the tags 132 having a determined correlation with one another greater than the correlation threshold 704.

The storyline 134 comprises a data structure associating tags 132 with their corresponding descriptions 210 and occurrence times 212 across time in the content 124. For example, the tags 132 which reference the same character of "Chet" may be used to generate the character storyline 304(2). The storyline 134 may be configured to present portions of the content designated by the plurality of tags 132 while omitting portions of the content 124 undesignated by the plurality of tags 132.

Block 1110 generates a stream of the content 124 comprising portions of the content 124 indicated by the one or more storylines. Block 1112 sends the stream of the content 124 to the device 104. As described above, the one or more portions of the content 124 which are not designated may be omitted from sending. In some implementations the one or more storylines 134 may be provided to the device 104, which may then select from locally stored content or direct the server 118 to deliver the portions designated in the storyline 134 in the sequence indicated by the storyline 134.

In some implementations the server 118 may deliver to the device 104 a data structure which comprises the occurrence times associated with the portions of the content indicated by the tags 132 in the storyline 134. The device 104 may then request the specific occurrence times from the server 118, or skip through the content 124 delivered by the server 118.

Figure 12:
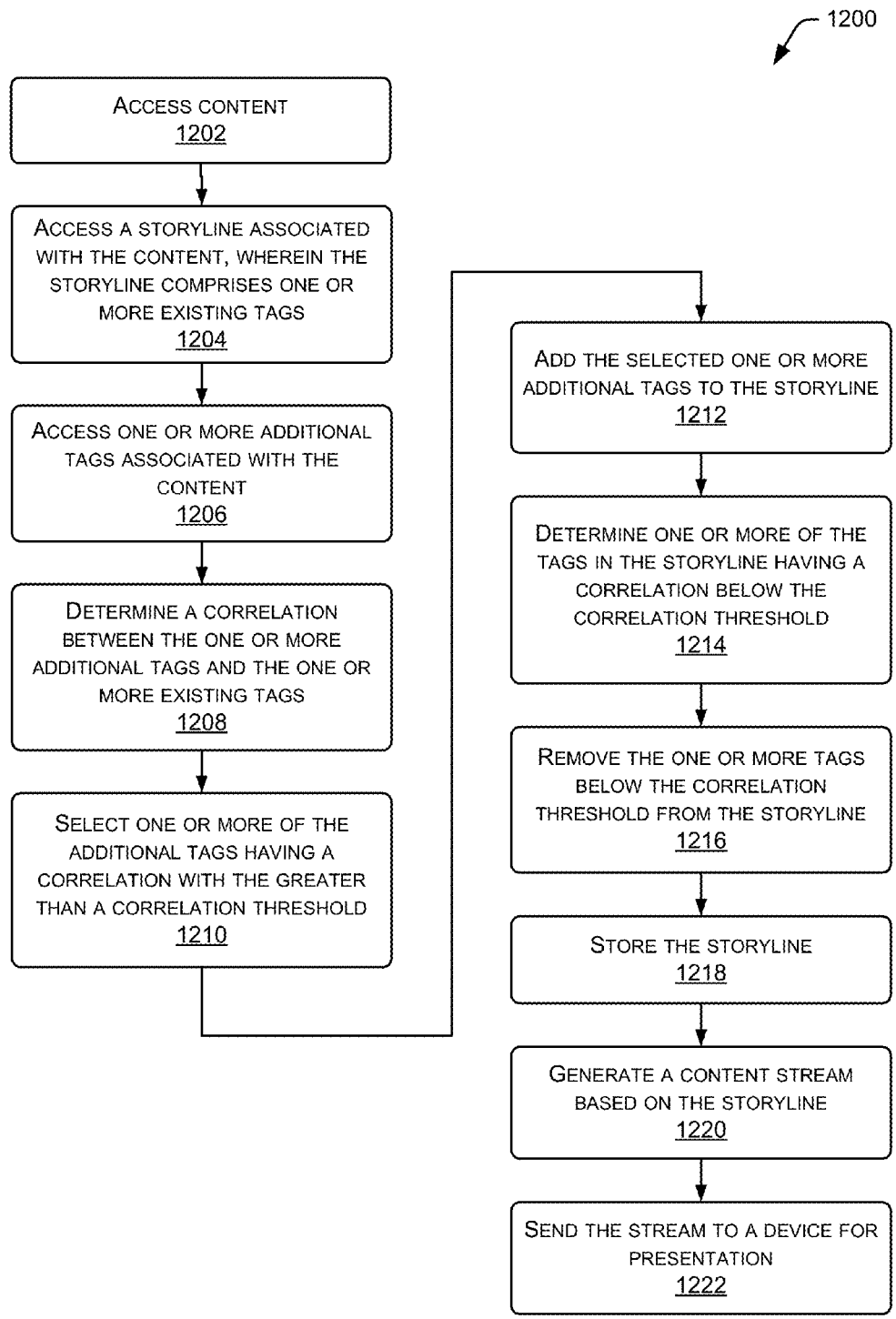
FIG. 12 illustrates a flow diagram of a process for modifying an existing storyline.

FIG. 12 illustrates a flow diagram of a process for modifying an existing storyline. This process may be implemented by the device 104, server 118, or both. Over time a storyline 134 may dynamically change by splitting, being copied and used to start new storylines 134, be merged with other storylines 134, and so forth. For example, a storyline 134(10) may have a plurality of tags 132 which are highly correlated to the tags 132 in another storyline 134(11). The storyline 134(11) may be merged into the storyline 134(10).) As mentioned above, the storylines 134 may dynamically change due to the addition or removal of tags 132, addition or removal of content 134 which is associated with the storyline 134, and so forth. For example, the storylines 134 for the "Burnt Sage" series may be updated as new episodes of "Burnt Sage Revisited" are added and new books in the series are published. While the process is described below using a singular reference to the content 124, in other implementations the process may be applied to one or more pieces of content 124, such as the works in the "Burnt Sage" series.

Block 1202 accesses one or more pieces of content 124, or portions thereof. For example, the content "Burnt Sage" and "Burnt Sage Revisited" may be retrieved from the datastore 614. In some implementations, block 1202 may be omitted.

Block 1204 accesses a storyline 134 associated with the one or more pieces of content 124. As described above, the storyline 134 comprises one or more existing tags 132.

Block 1206 accesses one or more additional tags associated with the content 124. For example, these may be tags 132 generated as described above for a new episode of "Burn Sage Revisited" or a new movie in the series.

Block 1208 determines a correlation between the one or more additional tags and the one or more existing tags in the storyline 134. The one or more existing tags are those which make up the storyline 134. This correlation thus provides for the addition of tags 132 to the existing storyline 134. In some implementations the tags 132 from one storyline 134 may be subsumed into another storyline 134 as described above.

Block 1210 selects one or more of the additional tags having a correlation with the one or more existing tags which is greater than a correlation threshold. For example, an additional tag 132 such as of the character "Johnny" which is highly correlated to the existing tag 132 of the character storyline 304(1) may be selected.

Block 1212 adds the selected one or more additional tags 132 to the storyline 1212. The additional tags 132 may be added to the storyline 134 such that the arrangement of the tags in sequence is maintained. With these additional tags 132, the storyline 134 is now updated to include additional material, such as from a new episode.

In some implementations the storyline 134 may be pruned. Block 1214 determines one or more tags 132 in the storyline 134 having a correlation with other tags in the storyline 134 which is below the correlation threshold. The correlation threshold may be static or dynamically adjustable. Block 1216 removes the one or more tags 132 below the correlation threshold from the storyline 134. In some implementations, the one or more removed tags 132 may used to form a separate storyline 134, or may be added to another existing storyline 134. Block 1218 may store the modified storyline, which now comprises the one or more additional tags and no longer comprises the one or more removed tags.

Block 1220 generates a stream of the content 124 comprising portions of the content 124 indicated by the one or more storylines. Block 1222 sends the stream of the content 124 to the device 104. For example, as described above, the stream may comprise the entire content from which the device 104 presents the particular portions indicated by the storyline 134. In another example, the stream may comprise only those portions designated in the storyline 134.

Figure 13:
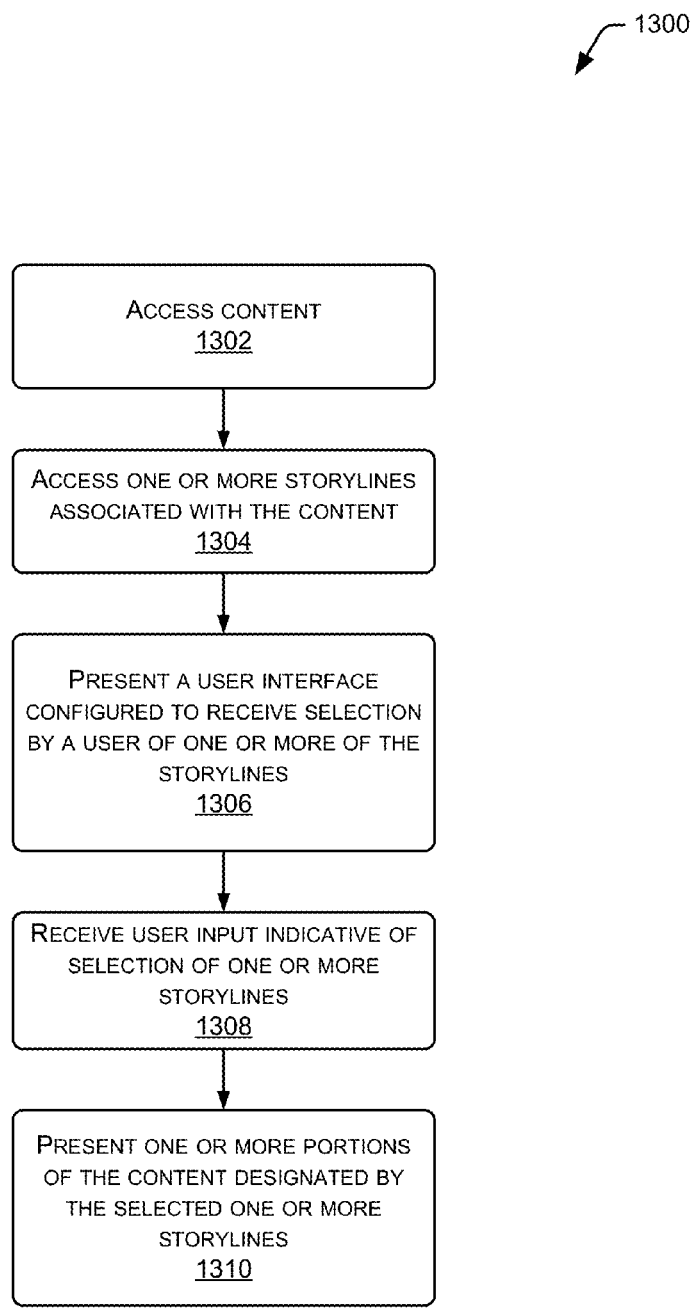
FIG. 13 illustrates a flow diagram of a process for presenting one or more storylines.

FIG. 13 illustrates a flow diagram 1300 of a process for presenting one or more storylines. This process may be implemented by the device 104, server 118, or both. Block 1302 accesses the content 124. Block 1304 accesses one or more storylines 134 associated with the content 124. For example, these may be storylines 134 generated by the storyline module 628.

Block 1306 presents a user interface configured to receive selection by a user of one or more of the storylines 134. For example, the user interface 300 may be presented showing the various storylines 134 for the content 124 "Burnt Sage." As described above, the user may select one or more of the storylines 134 for presentation.

In some implementations the order of presentation of the various storylines 134 may be based at least in part on one or more of the storyline determination parameters or other parameters associated with the storylines 134. For example, a storyline 134 which has tags 132 which are highly correlated with one another may presented at a beginning of a list of available storylines 134, while the storyline 134 which has the tags 132 with the lowest correlation to one another may be presented at an end of the list.

Block 1308 receives user input indicative of a selection from the user interface. For example, the server 118 or the device 104 may receive the selection from the user's cursor 310 to watch the character storyline 304(1) for "Johnny."

Block 1310 presents one or more portions of the content 124 designated by the selected one or more storylines 134. As described above, the one or more portions not designated may be omitting from presentation. In some implementations the one or more portions not designated may be omitted from streaming or transmission, such that only the designated portions are provided to the device 104.

In some implementations the presentation of the storylines 134, or the selection thereof, may be incorporated into the presentation of the content. For example, during the opening scene at "Ed's Mercantile" the various characters may leave at different times or through different exits. The user may be presented with a user interface which allows them to "follow" that character, thus selecting the storyline associated with the particular character. This "following" may include presentation of content 124 which shows the camera point of view changing to appear to follow the character as they exit.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. One or more non-transitory computer-readable media storing computer-executable instructions that, when executed by at least one processor, configure the at least one processor to perform operations comprising:
    accessing data comprising video content, wherein the video content comprises metadata associated with a cast of characters that appear in the video content;
    determining character recognition data indicative of a plurality of characters in the video content at one or more people appearance times in the video content, wherein the plurality of characters are selected from the cast of characters;

automatically generating a plurality of tags based at least in part on the character recognition data, the metadata, and the one or more people appearance times, each tag of the plurality of tags comprising text describing onscreen actions performed by a character of the one more characters;

determining a reliability metric for a first tag of the plurality of tags, wherein the reliability metric represents a correlation between the first tag and a first character of the plurality of characters;

determining that the reliability metric satisfies a reliability threshold;

generating a storyline, the generating comprising:
 selecting a first number of tags of the plurality of tags, the first number of tags being associated with reliability metrics satisfying the reliability threshold, wherein the first number of tags comprises the first tag;
 arranging the first number of tags by the people appearance times to form an arrangement;
 storing the arrangement as a storyline based at least in part on the text describing the onscreen events; and
providing the storyline to a device.

2. The computer-readable media of claim 1, the operations further comprising:
 determining that a user account is associated with a payment for a first portion of the video content designated in the storyline; and
 delivering the first portion of the video content to a device associated with the user account, while omitting the second portion of the video content that is not associated with the payment.

3. The computer-readable media of claim 1, wherein the reliability metric is a first reliability metric, the operations further comprising:
 receiving a user input for a second tag associated with the video content;
 determining that the second tag is a user-generated tag; and
 assigning the second tag a second reliability metric greater than the first reliability metric.

4. One or more non-transitory computer-readable media storing computer-executable instructions that, when executed by at least one processor, configure the at least one processor to perform operations comprising:
 accessing a plurality of tags associated with one or more pieces of content, each of the plurality of tags comprising information that describes storyline actions that are performed by a plurality of characters during playback of the one or more pieces of content, wherein each storyline action is associated with a particular character and a particular time during playback of the one or more pieces of content;
 determining that a first tag of the plurality of tags is a user-generated tag;
 determining that a second tag of the plurality of tags is an automatically generated tag;
 determining that a reliability metric for the second tag satisfies a reliability threshold, wherein the reliability metric represents a correlation between the first tag and a first character of the plurality of characters; and
 generating a storyline, the generating comprising:
  selecting a first number of tags from the plurality of tags based on one or more criteria;
  arranging the first number of tags in an arrangement, wherein the first number of tags comprises the first tag; and
  storing the arrangement as the storyline.

5. The computer-readable media of claim 4, the events comprising one or more of:
 appearances of the particular character during playback of a portion of the one or more pieces of content, wherein the particular character is selected from a cast of characters associated with the one or more pieces of content,
 appearances of a particular object during playback of a portion of the one or more pieces of content,
 particular onscreen locations during playback of a portion of the one or more pieces of content,
 instances of dialog associated with playback of a portion of the one or more pieces of content, or
 particular sounds during playback of a portion of the one or more pieces of content.

6. The computer-readable media of claim 4, wherein the criteria for the selecting the first number of tags comprises one or more of:
 a character name, an actor name, a theme, a plot line, a location, an object, or an activity.

7. The computer-readable media of claim 4, wherein arranging the first number of comprises sorting the first number of tags in ascending order from a lowest occurrence time during playback to a greatest occurrence time during playback.

8. The computer-readable media of claim 4, wherein selecting the first number of tags comprises selecting two tags, the generating the storyline further comprising:
 determining a correlation between the two tags selected from the plurality of tags; and
 wherein the criteria for the selecting the two tags comprises the first tag having a determined correlation with a second tag that is greater than a correlation threshold.

9. The computer-readable media of claim 4, the operations further comprising:
 determining content metadata associated with each particular time for each respective storyline action; and
 generating at least one of the plurality of tags associated with the one or more pieces of content based at least in part on information in the content metadata, wherein the content metadata comprises at least one of a title, genre, or cast of characters of the one or more pieces of content.

10. The computer-readable media of claim 4, wherein the storyline action comprises an appearance of the particular character and a character interaction between the particular character and another character during playback of the one or more pieces of content at the particular time; and
 the operations further comprising:
  determining character data indicative of the characters appearance at the particular time during playback of the one or more pieces of content; and
  generating at least one of the plurality of tags associated with the one or more pieces of content based at least in part on the determined character data and the particular time.

11. The computer-readable media of claim 4, wherein the one or more pieces of content is a single piece of continuous content, and the event comprises an appearance of an onscreen location during playback of the one or more pieces of content at the particular time during playback of the one or more pieces of content, wherein the onscreen location is identified in content metadata associated with the single piece of continuous content; and the operations further comprising:

determining location data indicative of the onscreen location associated with the-single piece of continuous content based at least in part on the content metadata; and generating at least one of the plurality of tags associated with the single piece of continuous content based at least in part on the determined location data and the particular time.

12. The computer-readable media of claim 4, wherein the event comprises an appearance of an object during playback of the one or more pieces of content at the particular time during playback of the one or more pieces of content; and the operations further comprising:

determining object data indicative of the object during playback of the one or more pieces of content at the particular time during playback of the one or more pieces of content; and generating at least one of the plurality of tags associated with the one or more pieces of content based at least in part on the determined object data and the particular time.

13. The computer-readable media of claim 4, the operations further comprising:

determining text data associated with the particular time; and generating at least one of the plurality of tags associated with the one or more pieces of content based at least in part on information in the determined text data and the particular time.

14. The computer-readable media of claim 13, the determining the text data comprising one or more of:

retrieving one or more text captions, recognizing speech with a speech recognition module, or recognizing writing with an optical character recognition module.

15. The computer-readable media of claim 4, the operations further comprising:

generating a stream of the storyline, the stream comprising the one or more pieces of content indicated in the arrangement; and providing the stream of content to a device for presentation.

16. The computer-readable media of claim 4, the operations further comprising:

determining that a user account has made a payment for the storyline;

determining that the storyline comprises a first portion is a first episode and a second portion in a second episode;

presenting the first portion of the first episode and the second portion of the second episode on a device associated with the user account; and omitting a first remainder of the first episode and a second remainder of the second episode.

17. A method comprising:

accessing a plurality of tags associated with one or more pieces of content, each of the plurality of tags comprising information that describes storyline actions that are performed by a plurality of characters during playback of the one or more pieces of content, wherein each storyline action is associated with a particular character and a particular time during playback of the one or more pieces of content;

determining that a first tag of the plurality of tags is a user-generated tag;

determining that a second tag of the plurality of tags is an automatically generated tag;

determining that a reliability metric for the second tag satisfies a reliability threshold, wherein the reliability metric represents a correlation between the first tact and a first character of the plurality of characters; and generating a storyline, the generating comprising:

selecting a first number of tags from the plurality of tags based on one or more criteria;

arranging the first number of tags in an arrangement, wherein the first number of tags comprises the first tag; and storing the arrangement as the storyline.

18. The method of claim 17, wherein the events comprise one or more of:

appearances of the particular character during playback of a portion of the one or more pieces of content, wherein the particular character is selected from a cast of characters associated with the one or more pieces of content, appearances of a particular object during playback of a portion of the one or more pieces of content, particular onscreen locations during playback of a portion of the one or more pieces of content, instances of dialog associated with playback of a portion of the one or more pieces of content, or particular sounds during playback of a portion of the one or more pieces of content.

19. The method of claim 17, wherein the criteria for the selecting the first number of tags comprises one or more of:

a character name, an actor name, a theme, a plot line, a location, an object, or an activity.

20. The method of claim 17, wherein arranging the first number of tags comprises sorting the first number of tags in ascending order from a lowest occurrence time during playback to a greatest occurrence time during playback.

21. The method of claim 17, wherein selecting the first number of tags comprises selecting two tags, the generating the storyline further comprising:

determining a correlation between the two tags selected from the plurality of tags; and wherein the criteria for the selecting the two tags comprises the first tag having a determined correlation with a second tag that is greater than a correlation threshold.

22. The method of claim 17, further comprising:

determining content metadata associated with each particular time for each respective storyline action; and generating at least one of the plurality of tags associated with the one or more pieces of content based at least in part on information in the content metadata, wherein the content metadata comprises at least one of a title, genre, or cast of characters of the one or more pieces of content.

* * * * *